June 30, 1970   P. F. McGRATH ET AL   3,517,415
DECORATIVE SPECTACLE FRAME COVER AND METHOD AND APPARATUS
FOR PRODUCING SAME
Filed May 22, 1967   3 Sheets-Sheet 1
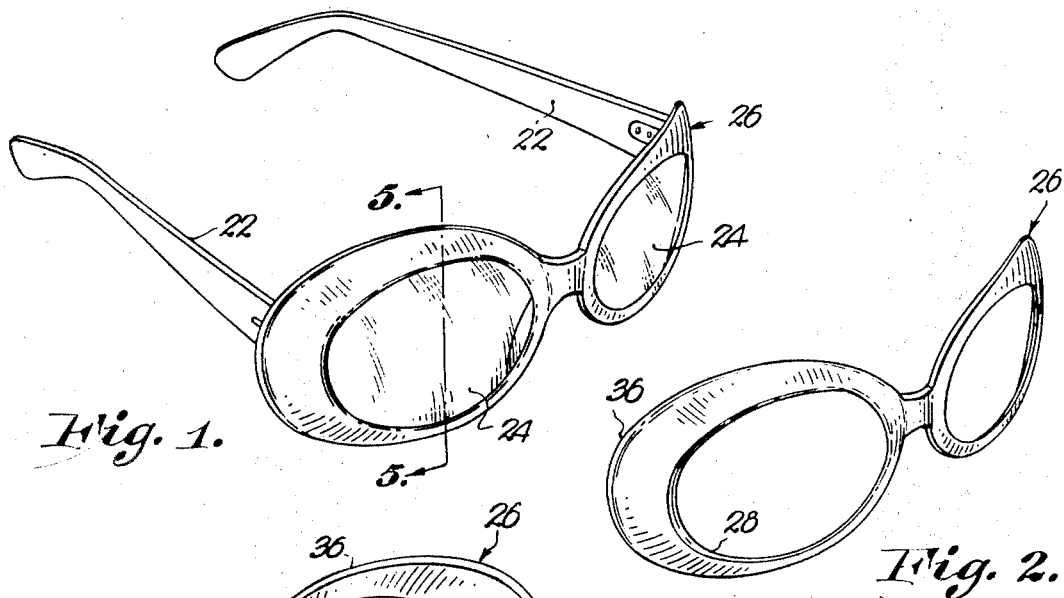
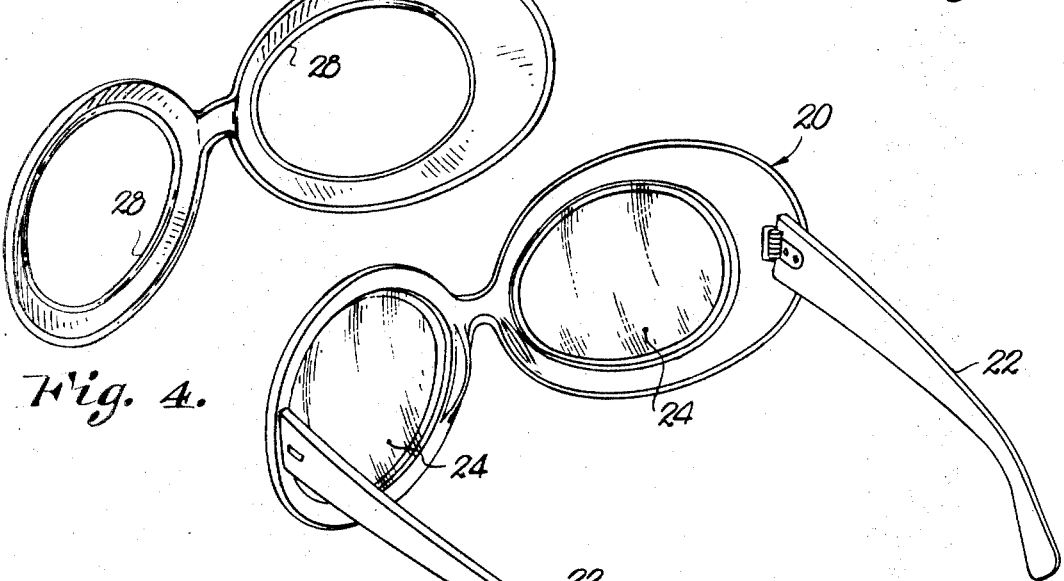
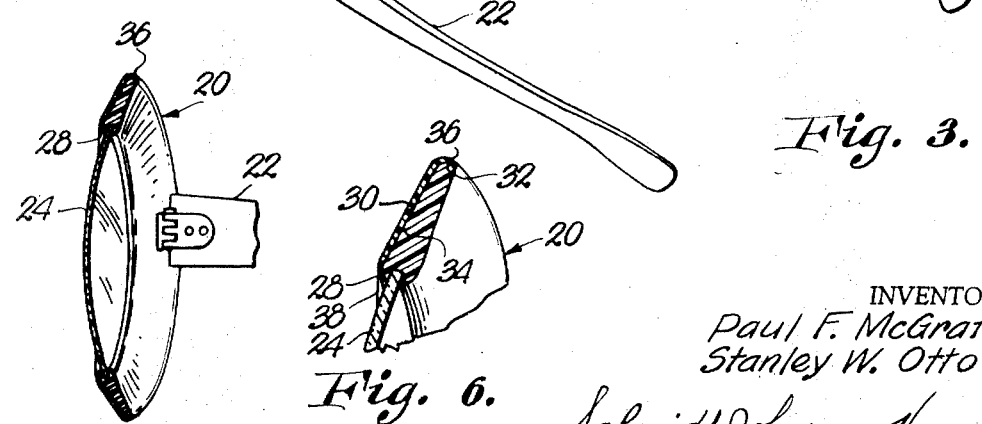
INVENTORS
Paul F. McGrath
Stanley W. Otto
BY Schmidt, Johnson, Hovey,
Williams & Bradley
ATTORNEYS Paul F. McGrath
Stanley W. Otto
INVENTORS.

BY Schmidt, Johnson, Hovey,
Williams & Bradley
ATTORNEYS.

June 30, 1970 P. F. McGRATH ET AL 3,517,415
DECORATIVE SPECTACLE FRAME COVER AND METHOD AND APPARATUS
FOR PRODUCING SAME
Filed May 22, 1967 3 Sheets-Sheet 3
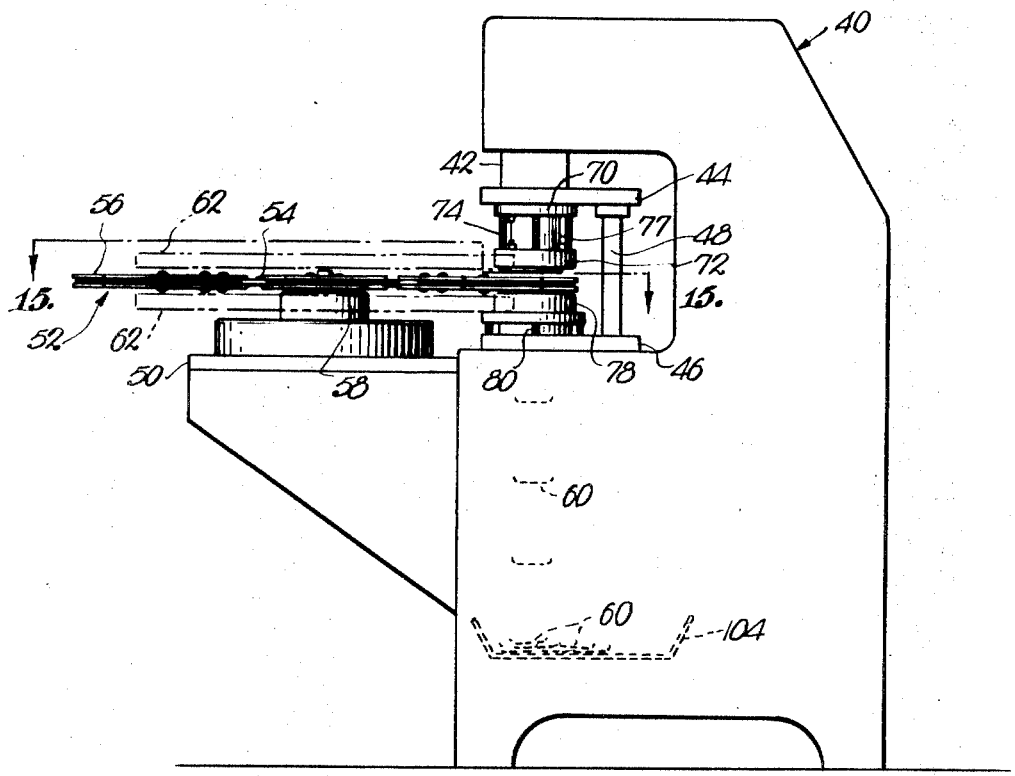
Fig. 14.
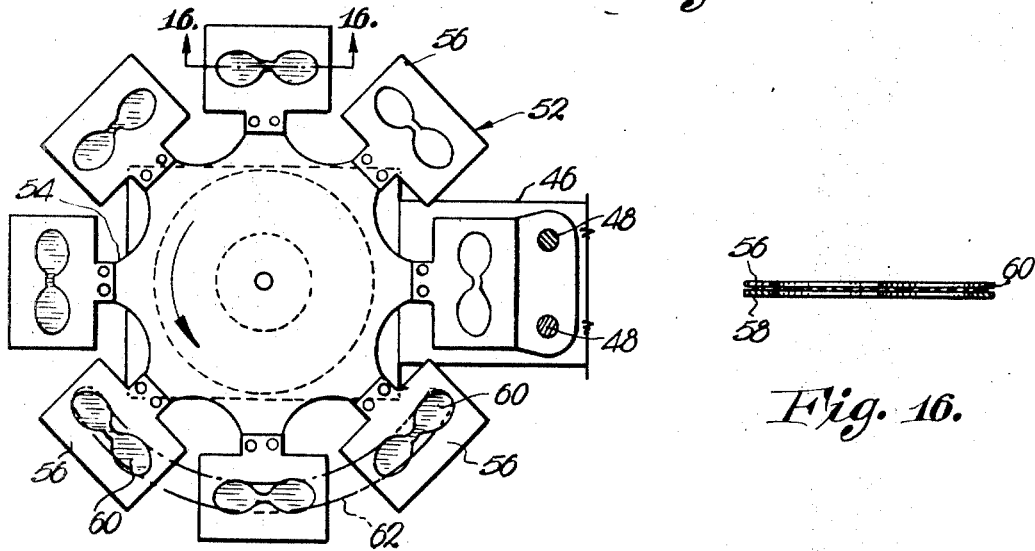
Fig. 15.
Fig. 16.
INVENTORS
Paul F. McGrath
Stanley W. Otto
BY *Schmidt, Johnson, Hovey,
Williams & Bradley*
ATTORNEYS

United States Patent Office 3,517,415
Patented June 30, 1970

3,517,415
DECORATIVE SPECTACLE FRAME COVER AND METHOD AND APPARATUS FOR PRODUCING SAME
Paul F. McGrath and Stanley W. Otto, Kansas City, Mo., assignors to Hallmark Cards, Incorporated, Kansas City, Mo., a corporation of Missouri
Filed May 22, 1967, Ser. No. 640,204
Int. Cl. B29c 17/00; B29d 12/02
U.S. Cl. 18—19
6 Claims

ABSTRACT OF THE DISCLOSURE

A removable spectacle frame cover is provided so that the wearer may change the color and appearance of the spectacle frame at will. The cover is formed from a blank of thermoplastic synthetic resin sheet material having desired decorative characteristics. The cover is flexible and has a peripheral lip which snaps over the rim of the spectacle frame. The inner face of the cover is configured to intimately contact the front surface of the frame between the lens and the rim; thus the cover closely conforms to the frame surface to augment the holding action of the lip and provide a neat appearance.

In the manufacture of the cover, the blank in heated, moldable form is clamped on a die body, then forced into the latter by a punch, pinch trimmed, subjected to a lip forming operation and ultimately ejected in finished form except for the stamping of the lens opening therein. Cooperable structure is provided to enable a single stroke of a die press ram to effect the forming of the cover, the lip being shaped through the use of a urethane forming member which cooperates with the punch after the blank is trimmed to press the peripheral edge of the trimmed blank into a groove in the periphery of the punch. Fabrication of the cover from a relatively thin sheet is facilitated by the use of a vacuum forming technique wherein the head of the punch has a pair of spaced recesses therein which are in communication with a vacuum system to cause the synthetic resin material to closely conform to the surface of the die punch.

---

Although many women object to wearing glasses and especially sunglasses with dark lenses since they often detract from their overall appearance, such glasses can actually become an asset from a fashion standpoint if the wearer can choose frames which match or complement the wearer's particular costume. Because of the impracticality of having glasses to match each individual outfit, particularly in the case of sunglasses which normally sell at a modest sum, it is desirable to provide means permitting an individual to change the color and decorative characteristics of the spectacle frame at will, as for example through the use of a cover for the frame. It is imperative, however, that the covers be readily removable to facilitate a change of attire. Equally important, it is requisite that the covers stay securely in place on the frame when attached, and unsightly fasteners or clips are to be avoided if an attractive appearance is to be assured.

It is, therefore, an important object of this invention to provide a spectacle frame cover which enhances an individual's appearance, remains secure on the frame after attachment, and yet is readily removable to permit the selective attachment of covers to the frame in accordance with the type of attire.

Another important object is to provide a cover as aforesaid which closely conforms to the frame to aid in attachment and conceals the underlying frame from view.

Furthermore, it is an important object of this invention to provide an improved method and apparatus for producing articles such as the aforesaid covers formed from blanks of sheet material. In particular, it is an aim of the invention to provide a means of forming and shaping each article in a single, continuous operation.

As a corollary to the foregoing aim, it is an important object to provide a means of shaping the blank after initial die forming thereof and during the forming stroke of a die press ram, in order to accomplish complete shaping and forming in a single, continuous operation as aforesaid.

Yet another important object of the instant invention is to provide a compressible, high memory forming member which effects the shaping of the blank as the ram advances the shiftable components of the forming assembly.

In the drawings:

FIG. 1 is a front perspective view of a pair of spectacles such as sunglasses showing the cover of the instant invention in place thereon;

FIG. 2 is a front perspective view of the cover detached from the spectacle frame;

FIG. 3 is a rear perspective view of the glasses shown in FIG. 1;

FIG. 4 is a rear perspective view of the cover illustrated in FIG. 2;

FIG. 5 is a sectional view taken along line 5—5 of FIG. 1;

FIG. 6 is an enlarged view of a portion of FIG. 5;

FIG. 14 is a side elevational view of the overall die press and indexing turret;

FIG. 15 is a sectional view taken along line 15—15 of FIG. 14; and

FIG. 16 is a sectional view taken along line 16—16 of FIG. 15.

The cover

Figure 7:
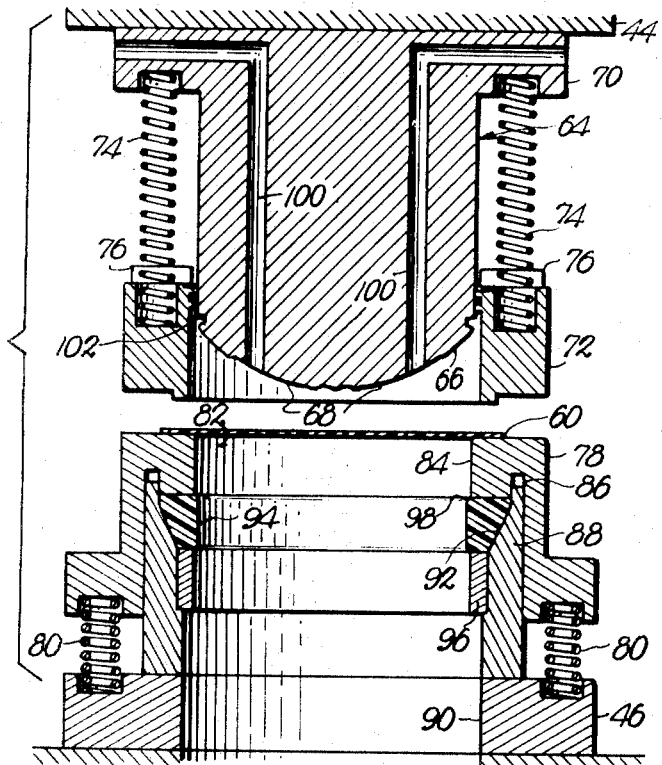
FIG. 7 is a vertical, sectional view of the forming assembly showing the same prior to actuation of the press ram.

A pair of sunglasses is illustrated in FIGS. 1–6 and includes a plastic frame 20 provided with left and right ear pieces 22 and having a pair of lenses 24 mounted therein. A plastic cover 26 is shown snapped on frame 20 in FIGS. 1 and 3, cover 26 being provided with a pair of continuous inner edges 28 defining a pair of lens openings which register with lenses 24 when cover 26 is in place on frame 20.

Particularly in FIGS. 5 and 6, it may be seen that frame 20 has a front surface 30 which is relatively flat and radiates outwardly from lenses 24, terminating in a peripheral rim 32. Cover 20 is composed of a relatively thin, sheet-like, synthetic resin material which is flexible and closely conforms to surface 30 of frame 20. Note that the rear face 34 of cover 26 intimately contacts surface 30 throughout the area of surface 30, the periphery of cover 26 being bent over to form a rearwardly projecting, continuous lip 36 complementally engaging rim 32. The portions of rim 32 circumscribing lenses 24 are transversely curved, lip 36 thus effectively hooking over rim 32 by virtue of its complemental curvature as is clear in FIG. 6. Additionally, each continuous inner edge 28 of cover 26 projects inwardly to engage frame 20 in the corresponding lens opening 38 of frame 20.

As will be discussed fully hereinafter, cover 26 is formed from a blank of thermoplastic sheet material, suitable materials including the vinyls and polycarbonates, as well as a sheet of the pictorial parallax panoramagram unit shown and described in Rice et al., U.S. Letters Patent No. 3,241,429, granted Mar. 22, 1966. For maximum versatility, the wearer would be provided with a number of covers 26 for the glasses, each cover being of a different color or design to complement particular articles of a wardrobe. In use, the desired cover 26 is simply snapped in place on frame 20, the cover being securely held on the frame by the joint action of lip 36 and the intimate contact of the rear face 34 of cover 26 with the front surface 34 of frame 20.

The forming apparatus

A die press 40 is illustrated in FIG. 14 and has a verticaly reciprocable, hydraulic ram 42 provided with a head plate 44. A baseplate 46 rests on the bed of the press and is provided with a pair of upstanding guide rods 48 slidably received by vertical openings (not shown) in head plate 44.

A platform 50 extends horizontally forwardly at approximately the level of the press bed and mounts an indexing turret 52 having a rotary carrier 54. Eight pairs of upper and lower holding plates 56 and 58 are secured to carrier 54 in equally circumferentially spaced relationship to one another, each pair of plates 56, 58 receiving and clamping a blank 60 therebetween of thermoplastic sheet. The plates 56 and 58 have vertically aligned openings or cutouts therein of approximately the shape of cover 26. The three pairs of plates 56 and 58 to be next shifted into the press by carrier 54 are disposed in a "sandwich heater" in the form of a pair of upper and lower, arcuate radiant heating elements 62 (shown in phantom lines in FIG. 14).

The forming assembly actuated by ram 42 is illustrated in FIG. 7. A forming component in the nature of a die punch 64 having a face of the configuration of the cover to be formed, is secured to head plate 44 and extends therebeneath, presenting a head 66 having a pair of recesses 68 therein, which define the lens openings of the cover (ultimately to be removed by a stamping operation). Punch 64 has a flange at its upper end presenting a carrier 70 for a hold-down ring 72 suspended from carrier flange 70. A plurality of coil springs 74 are disposed between flange 70 and ring 72 with their ends received in sockets therein. Ring 72 is provided with at least two upstanding stops 76 while spacer bolts 77 (FIG. 14) are employed to suspend ring 72 and limit the vertical spacing between the latter and flange 70.

A female component comprising a die component or body 78 is mounted on baseplate 46 through the medium of a plurality of coil springs 80 having greater resistance to compression than coil springs 74. Die body 78 has an opening 82 therein defined by a continuous internal wall 84 substantially conforming to the configuration of punch 64 and thereby the cover to be formed. (The cutouts in holding plates 56 and 58 are larger than opening 82 to permit the hold-down ring 72 to clamp blank 60 against die 78; plates 56 and 58 are not illustrated in FIGS. 7–11 for clarity, and blank 60 is thus shown as resting solely on die 78.) A slot 86 in die body 78 extends therearound in outwardly spaced, circumscribing relationship to opening 82 and receives the upper extremity of an upstanding, hollow bulging cam 88. The cam 88 is rigid with baseplate 46 and communicates opening 82 with an aperture 90 in baseplate 46.

Cam 88 is provided with an inclined, inwardly facing, continuous camming surface 92 which bears against the outer periphery of a compression or forming member 94 formed of an elastomeric material resistant to heat and having a relatively high degree of memory. Suitable materials include urethane, silicone rubber and neoprene with urethane being preferred. The member 94 is restricted against downward movement by an annular insert 96. Die body 78 overlies and rests upon member 94, the later being in the nature of a continuous strip or ring which projects inwardly with respect to the internal die wall 84 thereabove, thereby presenting a continuous shoulder 98 at the lower boundary of opening 82 which defines a restrictive passage.

Recesses 68 in the head 66 of punch 64 are communicated with positive or negative air pressure by a pair of ducts 100; it should be understood that ducts 100 are coupled by lines (not shown) to the system of a vacuum source. Additionally, punch 64 is provided with a continuous, peripheral groove 102 (see particularly FIG. 10) for shaping purposes to be discussed hereinafter. Press 40 is provided with a catch pan 104 (shown in broken lines in FIG. 14) which receives the covers after the forming operation as the same are ejected from punch 64 and gravitate through aperture 90 in baseplate 46.

Operation

Press 40 and indexing turret 52 are operated by automatic control apparatus (not shown) which effects incremental shifting and indexing of carrier 54 and reciprocation of ram 42. Each blank 60 is heated to its forming temperature by heating elements 62 prior to introduction into press 40. The blanks 60 are incrementally shifted into overlying relationship to die opening 82, indexing of carrier 54 being timed with the movement of ram 42 to effect insertion of a heated blank into the forming assembly when clearance is provided between the hold-down ring 72 and die body 78. Once blank 60 is positioned as illustrated in FIG. 7 within the forming assembly, ram 42 advances downwardly to commence the forming operation.

Figure 8:
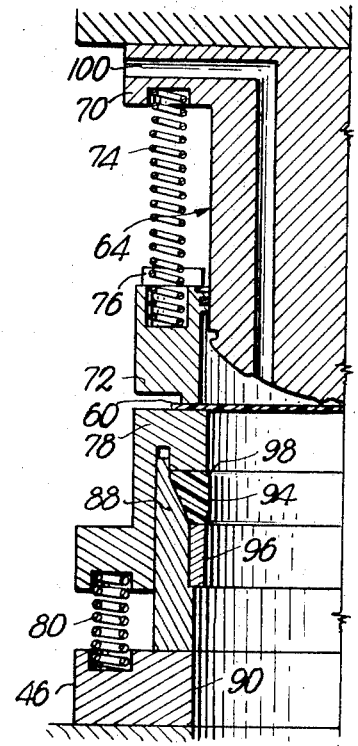
FIG. 8 is a partial section showing the structure of FIG. 7 after the punch has advanced downwardly a sufficient distance to clamp the blank between the hold-down ring and the die body.

The first step of the operation is illustrated in FIG. 8 where it may be seen that the hold-ring 72 clamps blank 60 on die body 78. Springs 74 are beginning to compress as downward movement of punch 64 continues.

Figure 9:
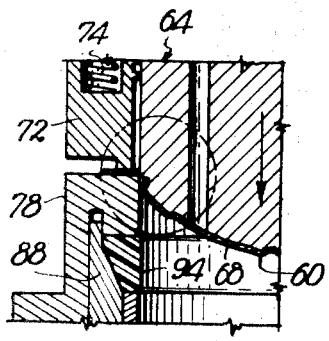
FIG. 9 is a fragmentary, partial section showing the punch after further movement.

FIG. 9 shows that the punch has advanced to a position where blank 60 now covers the head 66 of punch 64, vacuum being applied to ducts 100 to draw the material into recesses 68. The two recesses 68 correspond to the lens openings of the finished cover and form the two continuous inner edges 28 illustrated most clearly in FIG. 6. It should be understood at this junction that the lens openings will ultimately be removed by a separate stamping operation in a conventional machine for this purpose upon removal of the covers from press 40 after forming is completed.

Figure 10:
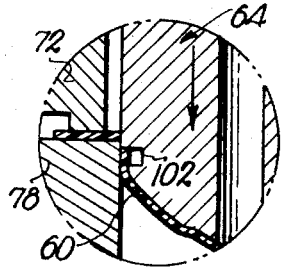
FIG. 10 is an enlarged view of the portion of FIG. 9 enclosed by the broken line circle, and illustrates pinch trimming of the blank.

FIG. 10 is an enlargement of the area circled in FIG. 9, and clearly reveals that blank 60 has been completely forced into die body 78 by punch 64 except for the peripheral flange of the blank clamped by hold-down ring 72. In FIG. 10 the continued movement of punch 64 has just pinched off the clamped flange of the blank to trim the latter.

Figure 11:
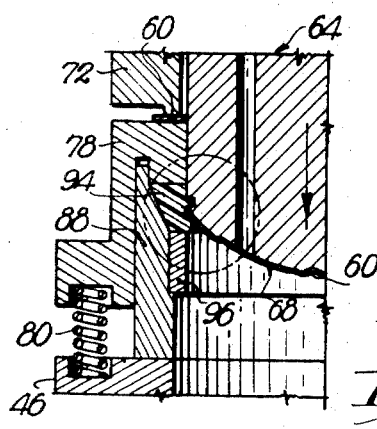
FIG. 11 is a fragmentary, partial section illustrating the components of the forming asembly after additional downward movement of the punch.
Figure 12:
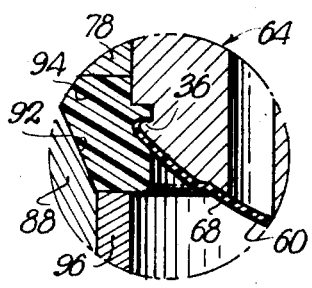
FIG. 12 is an enlarged view of the portion of FIG. 11 enclosed in the broken line circle, showing the bulging of the urethane forming member.

Before punch 64 reaches the position thereof illustrated in FIGS. 11 and 12, stops 76 engage carrier flange 70 to lock punch 64 and ring 72 together as a unit. Therefore, continued downward movement of the upper assembly now compresses springs 80 supporting die body 78, and the latter is forced downwardly a short distance. This is depicted in FIGS. 11 and 12 where it may be seen that the urethane member 94 is firmly confined on three sides by the downwardly displaced die body 78, camming surface 92, and the retained insert 96. Since member 94 is thus confined and is forced against the inclined camming surface 92, the member 94 is forced to bulge inwardly as the periphery of punch 64 enters the restricted passage presented by member 94. Urethane is resistant to heat and has a high memory, nearly 100%, and thus is the preferred material for construction of the male former which serves to press the peripheral edge of the trimmed blank 60 into groove 102, thereby shaping the edge to provide the peripheral lip 36.

Figure 13:
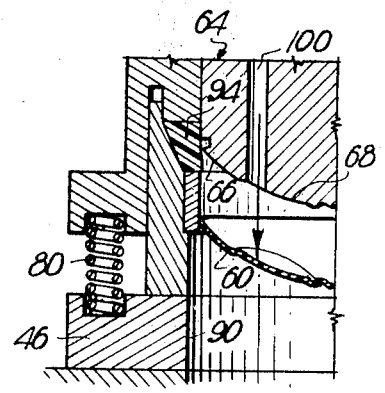
FIG. 13 is a fragmentary, partial section showing the ejection of the cover from the punch at the completion of the forming operation.

FIG. 13 illustrates the final step of the operation, wherein during upward movement of the punch 64 and relaxation of the member 94, the cover is stripped from punch head 66 by positive air pressure applied to ducts 100, thereby ejecting the completely formed cover from the forming assembly for gravitation into pan 104. As discussed above, the only remaining step in the production of the finished cover 26 is the stamping out of the lens openings.

It will be appreciated from the foregoing that the entire forming operation is accomplished during a single, continuous stroke of ram 42. Between strokes, turret 52 effects indexing of a fresh blank until such time that the eight blanks carried by the turret have been formed, whereupon the operation is interrupted and the holding plates 56, 58 reload with blanks.

Having thus described the invention, what is claimed as new and desired to be secured by Letters Patent is:

1. Apparatus for forming an article from a blank of sheet material, said apparatus comprising:
   a die component having an opening therein;
   a forming component receivable within the die component,
   one of said components being shiftable and normally spaced from the other component for receiving said blank between said components;
   means coupled with said one component for advancing the latter toward said other component along a path to effect passage of the forming component through said opening, whereby to draw the blank into the die component to cause initial shaping of the blank;
   a compressible forming member having a high memory and operable upon deformation thereof to press the initially shaped blank between the member and the forming component after the latter passes through said opening, said member cooperating with said forming component to impart the final shaping to the blank during said advancing of said one component along said path; and
   structure operated by said one component and engageable with said forming member for deforming the latter to effect said final shaping of the blank in timed relationship to movement of said forming component in the die component.

2. The invention of claim 1,
said advancing means being operable to shift said one component along said path in a single, uninterrupted driving stroke.

3. The invention of claim 1,
there being a hold-down for clamping the blank on the die component prior to entry of the forming component into said opening, whereby the blank is pinched between the wall and the forming component as the latter passes through the opening to trim the blank and provide the latter with a periphery complemental to said opening,
said forming component having a peripheral configuration selected to impart a desired shape to the periphery of the blank when the latter is pressed between the forming component and the member,
said advancing means being operable to shift said one component along said path in a single, uninterrupted driving stroke.

4. The invention of claim 3,
said forming component being provided with a blank-engaging head having a recess therein of preselected configuration,
there being passage means in said forming component communicating with said recess and adapted for communication with a vacuum system, whereby to provide a means of drawing the blank into the recess to impart the configuration of the recess thereto by vacuum forming.

5. The invention of claim 1,
said structure including a camming surface engaging said member and retaining the latter against outward movement,
yieldable means supporting said die component with the latter resting on said member, and
means carried by said forming component for shifting the die component against the action of said yieldable means after entry of the forming component into said opening and prior to said engagement of the blank with the shoulder of the member,
said shifting of the die component forcing the member against said camming surface to cause inward bulging of the member.

6. The invention of claim 5,
said die component shifting means including a hold-down for clamping the blank on the die component prior to said entry of the forming component, second yieldable means mounting said hold-down on said forming component for movement away from said die component against the action of said second yieldable means, and means limiting said movement of the hold-down to a distance less than the relative travel of said components after clamping of the blank required to effect said engagement of the blank with the shoulder of said member,
said second yieldable means having lesser resistance to yielding than the first mentioned yieldable means, whereby to permit said entry of the forming component before the die component is shifted to bulge the member.

References Cited

UNITED STATES PATENTS

| 2,132,002 | 10/1938 | Hight. | |
| 2,342,858 | 2/1944 | Hansen. | |
| 2,531,539 | 11/1950 | Smith | 18—19 |
| 2,547,331 | 3/1951 | Lent | 18—19 |
| 3,182,482 | 5/1965 | Moller | 18—19 XR |

WILLIAM J. STEPHENSON, Primary Examiner